No. 695,786. Patented Mar. 18, 1902.
W. G. BOLUS.
GRAIN DRILL.
(Application filed July 25, 1901.)
(No Model.)
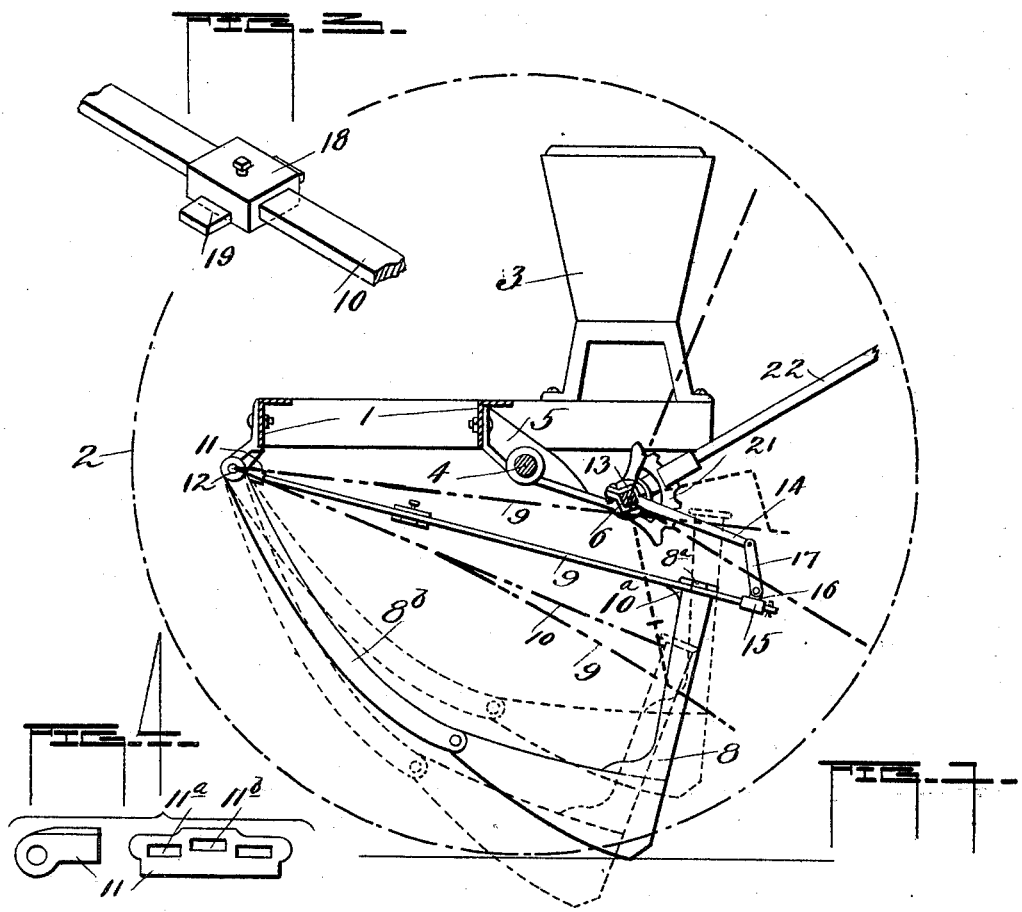
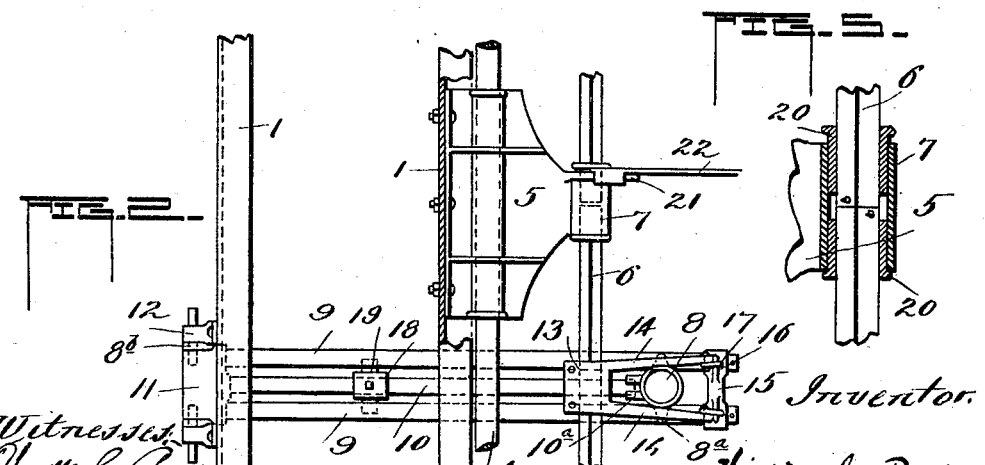
Witnesses
Inventor
William G. Bolus
By W. V. Tifft
Atty.

UNITED STATES PATENT OFFICE.

WILLIAM G. BOLUS, OF PEORIA, ILLINOIS, ASSIGNOR TO SELBY, STARR & COMPANY, OF PEORIA, ILLINOIS, A CORPORATION OF ILLINOIS.

GRAIN-DRILL.

SPECIFICATION forming part of Letters Patent No. 695,786, dated March 18, 1902.

Application filed July 25, 1901. Serial No. 69,683. (No model.)

*To all whom it may concern:*

Be it known that I, WILLIAM G. BOLUS, a citizen of the United States, residing at Peoria, in the county of Peoria and State of Illinois, have invented certain new and useful Improvements in Grain-Drills; and I do hereby declare that the following is a full, clear, and exact description of the invention, which will enable others skilled in the art to which it appertains to make and use the same.

This invention has reference to grain-drills, and especially to that class of drill known as "shoe-drill," wherein the shoes are arranged to form furrows for the seed by displacing the earth by pressure.

The object of my invention is the provision of spring-pressure mechanism for readily and easily pressing the drill-shoes in the earth and at the same time leave them free to rise separately in passing over obstructions.

A further object is the provision of draft and spring-pressure devices connected direct with the tube of the shoes and arranged with a slidable member for increasing or decreasing the tension of the spring-pressure device, and to mechanism for raising the shoes from the ground when the implement is not in use or when transporting it from field to field.

The machine in its general organization and arrangement of parts may be similar in construction to those now in use and need therefore be described in detail only so far as is necessary to an understanding of my improvement.

In the drawings, Figure 1 is a side elevation, partly in section, of my improved attachment to grain-drills, illustrating by the addition of dotted lines the several positions in which the parts are capable of being adjusted. Fig. 2 is a plan view of Fig. 1. Fig. 3 is a perspective view illustrating the slidable member carried by the draft and spring-pressure bars. Figs. 4 and 5 illustrate in elevation and sectional plan certain details.

Like numerals indicate corresponding parts throughout the figures, in which—

1 represents transverse frame parts supported upon ground-wheels 2 and carry frame parts supporting the seedbox 3.

4 refers to the axle connecting the ground-wheels 2, the same being suitably journaled in boxings at opposite end of the frame and in a center frame-support 5, carried by the inner frame 1.

6 represents rectangular rock-shafts, at their outer ends journaled in suitable supports and their inner ends carried by the tubular sleeves 20, having a bearing in a tubular support 7 of the frame 5.

8 indicates the feed-tube, connected with a suitable shoe at its lower end, and $8^a$ represents laterally-extended lugs from opposite sides of the annular flange at the upper end of the tube 8, and $8^b$ indicates draft-rods secured to the forward ends of the runners or shoes and their upper ends pivotally mounted on trunnions of the castings 12, attached to the front face of one of the frame-bars 1, as shown in Figs. 1 and 2.

9 indicates duplicate pressure-bars, detachably connected at their front ends in a casting 11 by being slipped into the perforations or depressions $11^a$, and their rear ends, extending rearwardly on each side of the tube, lie beneath and adjacent to lugs $8^a$, and 15 is a casting, the function of which will be further described, to which the rear ends of the bars 9 are attached by inserting them through perforations in the same and retaining the same in such position relative to the casting by cotter-pins dropped through perforations in the ends of the bars 9, as shown. The casting 11 is provided with suitable perforations, by means of which the same may be pivotally mounted on trunnions of the castings 12 after the draft-rods $8^b$ have been adjusted in position.

10 indicates a draft and spring-pressure bar, the forward end of which is detachably attached to the casting 11 by being inserted into a perforation or slot $11^b$, and the rear end is attached to the upper end of the tube by connection with a lug or extension $10^a$ from its front face, as shown.

18 is a member slidably connected or secured on the draft and spring-pressure bar 10, and the same is provided with laterally-tapered extensions 19 from opposite sides, arranged to be carried beneath and lie adjacent to the under face of the pressure-bars 9. The arrangement of the bars 9 and 10 and their connection with the casting 11 and tube are such that they lie approximately parallel to each other, which permits of the connection of the slidable member on the bar 10 with the pressure-bars 9, as shown. Thus it will be seen that the adjustment of the slidable member 18 toward the casting 11 or the tube 8 decreases or increases the tension of the spring-pressure bars 9 and 10.

13 indicates suitable castings attached to the rock-shaft 6 and are provided with the bifurcated extensions 14, and 17 represents short links or straps pivotally connected with the free ends of the extensions 14 and at their opposite ends have a pivotal connection with lips or lugs 16, extending up from the casting 15.

It is understood that the parts above described are arranged in series, and the mechanism for raising or depressing the tube and shoes comprise the segment-rack 21, forming a part of one of the tubular sleeves 20, and the lever 22, having connection with the sleeve in any desired manner.

The operation of the device will be readily understood by an examination of the drawings, from which it will be seen that to raise the shoes when transporting the machine the lever 22 is raised to its highest point, (indicated by the dotted lines in Fig. 1,) which causes the arm 9, through the rock-shaft and connection of the same with the arms, to bear against the lugs 8ª of the tube 8 and raise the same. The bars 9 and the draft and spring-pressure bar 10, through their connection with the casting 11, will swing on the trunnions of the casting 12, as shown, and for pressing the drill-shoes into the earth the movement of the lever is just the reverse, throwing it into the position indicated in dotted lines in the same figure. This movement of the lever will force the bars 9 downwardly away from the lugs 8ª of the tube 8, impart pressure to the draft and spring-pressure bar 10 through the lugs 19 of the slidable member carried thereby, which will impart direct pressure to the tube through the connection of the bar 10 with the lip 10ª for pressing the shoe into the earth, the adjustment of the slidable member, as suggested, increasing or decreasing the pressure upon the shoe, as desired.

I do not wish to limit myself to the construction of parts coöperating as a whole to the successful operation of my device, as I am aware that various changes may be made in the casting supporting said devices and details throughout resorted to without affecting the principle of applying my invention to obtain direct pressure upon the shoe and tube.

Having thus fully described my invention, what I claim, and desire to secure by Letters Patent of the United States, is—

1. In a grain-drill, the combination with conducting-tube, shoe and draft-rods, the draft-rods pivoted to trunnions of the frame, a suitable casting having a pivotal connection with said trunnions, spring-pressure bars connecting with the casting and having a bearing relation with devices of the tube, a supplemental spring-pressure bar attached one end to the tube and the opposite end to the casting and a slidable member on the supplemental bar having a bearing relation to the aforesaid bars, substantially for the purpose described.

2. In combination with the frame of a grain-drill, and a tube having a pivotal connection therewith through suitable draft-rods, of spring-pressure bars pivotally connected to the frame and their free ends lying adjacent to extended devices of the tube, mechanism for raising or lowering said bars, a slidably-arranged member engaging the lower faces of the bars having connection with means connected direct to the tube, arranged when the spring-pressure bars are depressed to force the tube into the earth, substantially in the manner herein shown.

3. In a grain-drill, the mechanism for applying spring-pressure to the shoes thereof, comprising the pressure-bars 9 and 10, said bars connected in a single casting pivotally connected with the frame, of the slidably-arranged member 18 on the bar 10, and extensions 19 lying adjacent to the faces of the bars 9, in combination with connecting devices of a rock-shaft and extensions of the shoes for raising the same or imparting direct pressure upon the shoes for depressing the same, substantially as described.

4. The mechanism for depressing or raising drill-shoes of a grain-drill, comprising in combination with the tube, shoe and draft-rods, a swinging casting pivoted to trunnions of the frame, duplicate spring-pressure bars detachably connected with said casting and their rear ends engaging laterally-extended lips of the tube, and joined by a casting having connection with mechanism carried by a rock-shaft, a spring-pressure bar lying between and approximately parallel with the aforesaid bars, its front end connected with the casting and its rear end secured in a socket of the tube, and a slidably-arranged member of the bar having devices engaging the lower surfaces of the duplicate bars, the adjustment of the member on the bar increasing or decreasing the tension of the spring-pressure devices, substantially as described.

5. In combination with tube, shoe and draft-rods, the casting 11, pivoted to the frame and provided with a series of perforations or slots, a series of spring-pressure bars connected with the casting in the perforations, one of said bars having a positive connection with the tube, adjustably-carried tension devices between the bars, and a rock-shaft arranged with castings having connection with devices of the outer bars of the series for raising the shoes or depressing the same through the bar having a positive connection therewith, substantially as described.

6. In combination with ground-wheels and frame, the tube, shoe and connections of the shoe with the frame, casting 11, the spring-pressure bars 9 extending rearwardly of the tube and joined in the casting 15, rock-shaft 6 and connections substantially as shown between the rock-shaft and bars 9, of the spring-pressure bar 10 carried between the bars 9 with a slidable member having lips 19 engaging the bars 9, and the means of raising the tube and shoe through the bars 9 and for depressing the shoe through direct pressure applied to the bar 10 connected one end to the tube, through the bars 9 and movement of the rock-shaft, all substantially as herein arranged and described.

In testimony whereof I affix my signature in presence of two witnesses.

WILLIAM G. BOLUS.

Witnesses:
CLARENCE J. ROSEBERY,
W. V. TEFFT.